A. L. PUTNAM.
DEMOUNTABLE RIM.
APPLICATION FILED JULY 13, 1917.
1,295,792.
Patented Feb. 25, 1919.
2 SHEETS—SHEET 1.
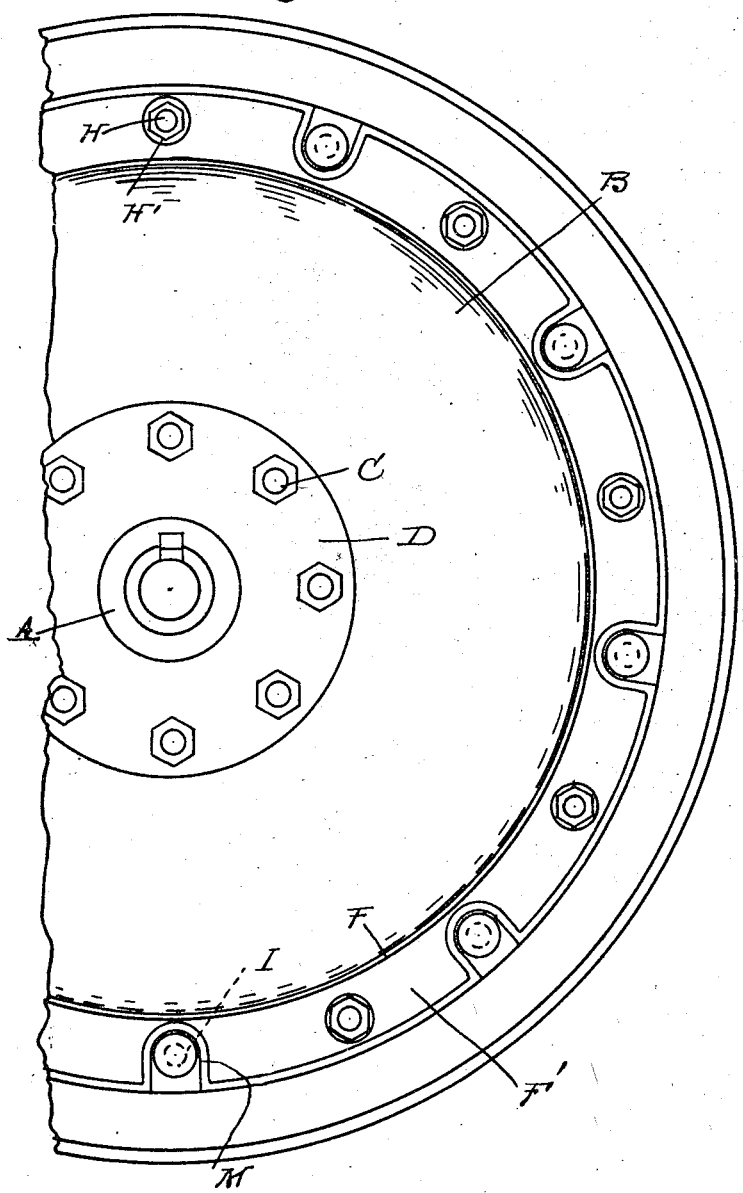
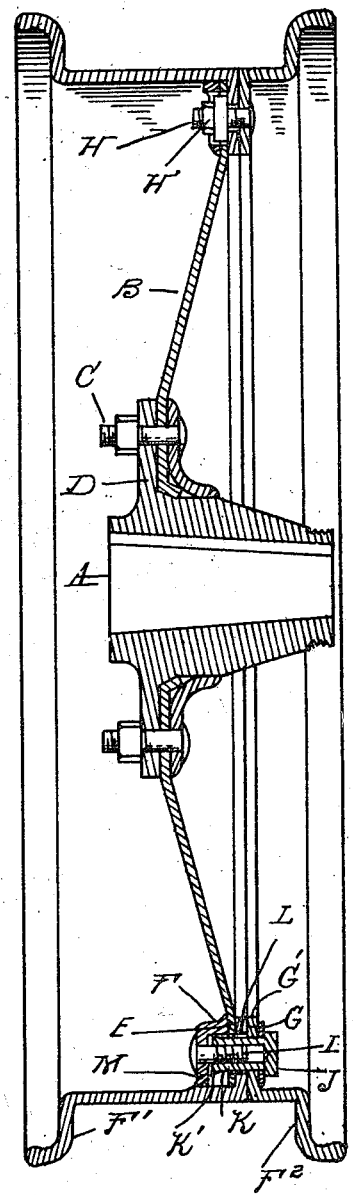
Inventor
Alden L. Putnam
By Whittemore Hulbert & Whittemore
Attorneys

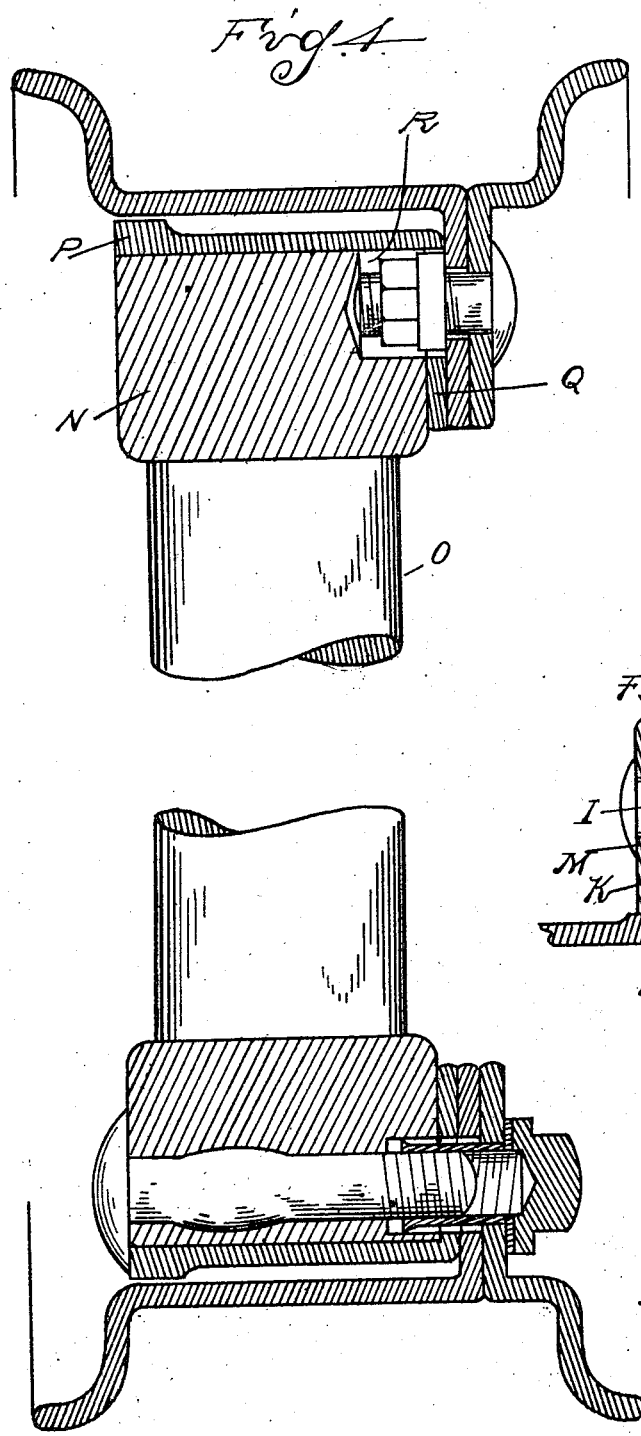
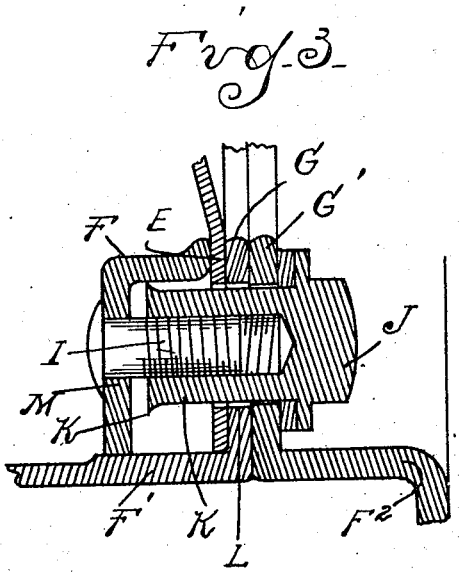

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

DEMOUNTABLE RIM.

1,295,792.     Specification of Letters Patent.     Patented Feb. 25, 1919.

Application filed July 13, 1917. Serial No. 180,257.

*To all whom it may concern:*

Be it known that I, ALDEN L. PUTNAM, a citizen of the United States of America, residing at Detroit, in the county of Wayne and State of Michigan, have invented certain new and useful Improvements in Demountable Rims, of which the following is a specification, reference being had therein to the accompanying drawings.

The invention relates to demountable rims for vehicle wheels and is particularly adapted for use in connection with wheels having large sizes of tires, such for instance as are used upon trucks. It is the object of the invention to facilitate mounting and demounting the tire in relation to the rim, and also the mounting and demounting of the rim in relation to the wheel. To this end the invention comprises the construction as hereinafter set forth.

In the drawings:

Figure 1 is a cross section through a wheel to which my improved demountable rim is applied;

Fig. 2 is a side elevation thereof;

Fig. 3 is an enlarged cross section of the securing means for the demountable rim;

Fig. 4 is a similar view showing a modified construction.

My invention is applicable to various types of vehicle wheels, but as shown is applied to a metallic wheel of the dished disk type, in which A is the hub, B is the dished disk body of the wheel and C are clamping bolts for securing the disk to the flange D of the hub. The peripheral portion E of the disk is arranged in the plane of rotation and in connection with a clamping ring F forms in effect a felly of the wheel. The demountable rim is formed in two sections which adjoin in the plane of rotation and at one side of the felly portion of the wheel body. These sections F' and F² are provided with inwardly-extending annular flanges G and G' lying adjacent to each other and secured at intervals by clamping bolts H. To secure the rim to the wheel a second series of bolts I are arranged intermediate the bolts H, said bolts I being secured to the felly portion of the wheel and preferably to the rim F and extending through apertures in the flanges G and G'. J designates nuts for engaging the bolts I and clamping the flanges G and G' against the felly portion E. It is desirable to retain the nuts J in relation to the demountable rim so that they may not be lost during exchange of rims. On the other hand, it is desirable that the nuts should be successively engageable with and disengageable from their respective bolts and without interference with each other. I therefore form the nuts J with cylindrical portions K longitudinally adjustable in the apertures in the flanges G and G' and provide a retaining shoulder K' at the inner end of the portion K. This shoulder or enlargement of diameter is sufficient to prevent the nut from being detached from the flange G', but the aperture L in the flange G is sufficiently large for the passage of said shoulder, thereby permitting the flanges G and G' to be separated from each other, the nuts being retained by the flange G'. The amount of longitudinal adjustment of the portions K in the flange G' is sufficient for the complete screwing on to or screwing off from the bolt I, and to provide space for receiving this portion K when the nuts are tightened the ring F is formed with embossed portions M for receiving both the bolts I and portion K of the nut.

In mounting the tire upon the rim the bolts H and nuts H' thereof are disengaged to permit of separating the sections F' and F². The tire is then placed upon the section F' and the section F² reëngaged therewith and secured by again clamping the bolts and nuts H and H'. To mount the rim upon the wheel it is slipped over the felly portion of the wheel until the flanges G and G' lie adjacent to the portion E, while the nuts H' are passed through registering apertures in said portion E. The nuts J are then successively secured upon the bolts I, which will draw the flange G against the portion E on one side thereof and the ring F against the opposite side thereof. When all of the nuts are thus secured the rim will be firmly attached to the wheel and will retain its firm engagement therewith until it is necessary to make another replacement.

As shown in Fig. 4, a demountable rim is applied to a wooden wheel in which N is the wooden felly, O the spokes and P the metallic rim secured to the felly and having the flange Q on one side thereof. The demountable rim is applied to this wheel by placing the flanges of the complementary rim sections adjacent to the flange Q and securing them by bolts and nuts in the manner previously described. The felly and flange Q are cut-away at R to receive the clamping bolts and nuts which secure the rim sections to each other.

The term wheel body as used in the preceding description and in the following claims is considered to denote a structure which may either include a felly or omit the same.

What I claim as my invention is:

1. The combination with a wheel body, of a demountable rim formed in sections separable in a plane at one side of the wheel body and provided with adjacent inwardly-extending flanges, a series of clamping bolts for securing said flanges to each other, an intermediate series of clamping bolts for securing said flanges to the wheel body, and nuts firmly attached to the rim coöperating with the last-mentioned bolts and adapted to be successively screwed on and off the same.

2. The combination with a wheel body, of a demountable rim formed in sections separable in a plane at one side of said wheel body and provided with inwardly-extending adjacent flanges, a series of bolts for securing said flanges to each other, an intermediate series of bolts secured to said wheel body engaging rim flanges intermediate the clamping bolts therefor, and a series of nuts for coöperating with the last-mentioned bolts, said nuts being permanently mounted on one of the flanges of said rim sections and adapted to be successively screwed on and off from the bolts on said wheel body.

3. The combination with a wheel body, of a demountable rim formed in sections separable in a plane at one side of said wheel body and provided with adjacent flanges, a series of bolts for securing said flanges to each other, a series of bolts secured to said wheel body intermediate the bolts of said rim, a series of nuts for coöperating with said wheel body bolts, said nuts being provided with cylindrical portions slidably engaging apertures in the flanges of said rim sections and a shoulder for limiting the sliding movement to retain engagement of the nut with one of said flanges permitting of disengagement from the other of said flanges.

4. The combination with a wheel body, of a demountable rim formed in sections separable in a plane at one side of said wheel body and provided with adjacent inwardly-extending flanges, a series of bolts for securing said flanges to each other, a ring upon the opposite side of said wheel body from that of said flanges, said ring having embossed portions, bolts secured within the embossed portion of said ring, and nuts having cylindrical portions longitudinally-slidably engaging one of the flanges of said rim sections and adapted to be secured on to said bolts within the embossed portions of said ring.

5. The combination with a wheel body, of a demountable rim formed in sections separable in a plane at one side of said wheel body and provided with adjacent flanges, a series of bolts secured to the wheel body, a series of nuts for coöperating with said bolts said nuts having cylindrical portions slidably engaging apertures in the flanges of said rim sections, and a shoulder for limiting the sliding movement to retain engagement of the nut with one of said flanges permitting of disengagement from the other of said flanges.

6. The combination with a wheel body, of a demountable rim formed in sections separable in a plane at one side of said wheel body and provided with adacent inwardly-extending flanges, a ring upon the opposite side of the wheel body from that of said flanges, said ring having embossed portions, bolts secured within the embossed portions of said ring, and nuts permanently engaged with one of said flanges passing through the flanges and through the wheel body for engagement with said bolts.

7. The combination with a wheel body, of a demountable rim formed in sections separable in a plane at one side of said wheel body and provided with adjacent flanges, a series of bolts secured to the wheel body, a series of nuts for coöperating with said bolts, said nuts fitting loosely in apertures in one of said flanges and being restrained against disengagement from said apertures, said nuts having an axial play in said apertures to permit of their engagement with and disengagement from the bolts without entailing the movement of said apertured flange.

In testimony whereof I affix my signature.

ALDEN L. PUTNAM.